(12) United States Patent
Weingarten (10) Patent No.: US 7,124,774 B2
(45) Date of Patent: Oct. 24, 2006

(54) CONTROL VALVE (75) Inventor: Zvi Weingarten, Kibbutz Evron (IL)

(73) Assignee: Bermad Limited Partnership, Kibbutz Evron (IL)

( * ) Notice: Subject to any disclaimer, the term of this patent is extended or adjusted under 35 U.S.C. 154(b) by 409 days.

(21) Appl. No.: 10/479,598

(22) PCT Filed: Jun. 4, 2002

(86) PCT No.: PCT/IL02/00433

§ 371 (c)(1),
(2), (4) Date: Dec. 4, 2003

(87) PCT Pub. No.: WO02/099321

PCT Pub. Date: Dec. 12, 2002

(65) Prior Publication Data
US 2004/0168726 A1    Sep. 2, 2004

(30) Foreign Application Priority Data
Jun. 6, 2001   (IL)   .................................... 143599

(51) Int. Cl.
*F16K 21/10*   (2006.01)
(52) U.S. Cl. ................... 137/514.7; 137/552; 137/556; 251/61.2; 251/82
(58) Field of Classification Search ............ 137/514.7, 137/552, 556; 251/61.2, 82
See application file for complete search history.

(56) References Cited
U.S. PATENT DOCUMENTS

| 419,447 | A | * | 1/1890 | Hussey | .................... 137/514.7 |
|---|---|---|---|---|---|
| 1,499,578 | A | * | 7/1924 | Hera | .......................... 137/270 |
| 2,366,144 | A | * | 12/1944 | Griswold | ..................... 137/496 |
| 2,373,654 | A | * | 4/1945 | Beekley et al. | ............... 251/86 |
| 2,573,369 | A | * | 10/1951 | Snoddy | ................... 251/30.05 |
| 2,602,467 | A | * | 7/1952 | Griswold | ................... 251/61.2 |
| 2,710,162 | A | * | 6/1955 | Snoddy | ..................... 251/61.2 |
| 2,877,793 | A | * | 3/1959 | Pommier | ................. 137/514.7 |
| 2,882,006 | A | * | 4/1959 | Reinecke | ..................... 251/26 |
| 3,982,558 | A | * | 9/1976 | Ochs | .......................... 137/455 |
| 4,044,787 | A | * | 8/1977 | Sutherland | .................. 137/107 |
| 4,516,599 | A | * | 5/1985 | Nakaya et al. | ............. 137/375 |
| 4,624,442 | A | * | 11/1986 | Duffy et al. | ............... 251/61.1 |
| 5,294,090 | A | * | 3/1994 | Winnike | ...................... 251/36 |
| 5,390,697 | A | * | 2/1995 | Muschelknautz | ........... 137/494 |
| 5,829,473 | A | * | 11/1998 | Hajbi et al. | ............ 137/315.28 |

* cited by examiner

*Primary Examiner*—Eric Keasel
*Assistant Examiner*—Craig Price
(74) *Attorney, Agent, or Firm*—Mark M. Friedman (57) ABSTRACT

A control valve for regulating flow of fluids passing through the valve. The control valve includes a body with an inlet, an outlet and a passageway through which the fluid passes from the inlet to the outlet. The control valve also includes a displaceable column provided with an internal and concentric bolt, the displaceable column is actuated by an actuator, the actuator positioned in a chamber that is connected to the body, a valve closure attached to the displaceable column. The displaceable column moves between a most retracted position, in which the inlet is fluidically communicating with the outlet, and a most pulled out position, in which the valve closure sealingly blocks the passage of fluid through the control valve.

7 Claims, 10 Drawing Sheets

CONTROL VALVE

FIELD OF THE INVENTION

The present invention relates to fluid control valves. More particularly, the present invention relates to a stable control valve having a double-chamber actuator.

BACKGROUND OF THE INVENTION

Fluid control valves are well known in the art. Control valves are used to regulate or completely shut the flow of liquids (organic or non-organic) as well as gaseous systems.

An example of a diaphragm type control valves can be seen in U.S. Pat. No. 5,383,646 "Diaphragm Control Valve" by Weingarten filed in 1994. This type of diaphragm control valve includes a diaphragm valve member having an outer peripheral section for securing the diaphragm within the valve housing, a valve-closer section displaceable with respect to the valve seat for controlling the flow. The control valve further includes an intermediate flexible section permitting the displacement of the valve-closer section and a cylindrical guiding section between the guide valve-closer and the intermediate flexible section. Other hydraulic valves, diaphragm valves and others are manufactured by Clayton Co. LTD and are referred as Clayton valves.

One of the problems of such type of control valves that haven't been solved yet is the lack of stability in the closure performance. The stability and steadiness in which the action of the valve's shut-down is performed is needed in order to block and seal the flow of fluids through the valve's passageway in spite of turbulence and shock waves of the fluid or the surroundings.

It is also desirable to enhance the performance of the control valves in order to improve their action by providing better pressure control and better precaution measures.

SUMMARY OF THE INVENTION

It is an object of the present invention to provide a fluid control valve that is steady and better endures shocks that are initiated by the fluids passing through the valve or initiated from the environment of the control valve.

It is another object of the present invention to provide a fluid control valve that is provided with a relatively wide column that facilitates guidance and a stable closure of the control valve's passageway. The column's width is about 40–60 percent of the valve seat's diameter.

It is yet another object of the present invention to provide a fluid control valve that is provided with an actuator that is operated in a hydraulic or pneumatic manner. The actuator of the present invention is provided with a diaphragm that divides the actuator into two control chambers, a fact that facilitates better control over the pressures in both chambers. Moreover, adjustments of flow and pressure according to pressure measurements in the passageway are provided also.

It is an additional object of the present invention to provide a fluid control valve that is provided with an independent inner check valve. The wide column's hollow stem acts as a housing for the inner check valve.

It is thus provided a control valve for regulating flow of fluids passing through the valve, said control valve comprising:

a body having an inlet, an outlet and a passageway through which the fluid passes from said inlet to said outlet;

a displaceable column provided with an internal and concentric bolt, said displaceable column is actuated by an actuator, said actuator positioned in a chamber that is connected to said body;

a valve closure attached to said displaceable column;

wherein said displaceable column moves between a most retracted position, in which said inlet is fluidically communicating with said outlet; and a most pulled out position, in which said valve closure sealingly blocks the passage of fluid through said control valve, whereby said displaceable column is relatively wide so that the column and the internal bolt provide steadiness and reliability to the performance of said control valve.

Furthermore, in accordance with another preferred embodiment of the present invention, a circular valve seat circumscribing said passageway is screwed to said body, said circular valve seat is adapted to receive and support said valve closure, and wherein the width of said column is about 0.4 to 0.6 of the diameter of said valve seat.

Furthermore, in accordance with another preferred embodiment of the present invention, said actuator is controlled using hydraulic means in which said displaceable column is moving by changing pressure in said chamber.

Furthermore, in accordance with another preferred embodiment of the present invention, said chamber is divided into two sections by a diaphragm, said diaphragm is connected to said displaceable column.

Furthermore, in accordance with another preferred embodiment of the present invention, said displaceable column is provided with a dish, the width of said dish is greater than the width of said displaceable column and wherein said diaphragm is connected to said dish and secured by a top diaphragm washer.

Furthermore, in accordance with another preferred embodiment of the present invention, when said displaceable column is retracted, said bolt is accommodated in a top cover, said top cover is a sheath that is adapted to guide said bolt upwardly so that said displaceable column is kept steady while retracted.

Furthermore, in accordance with another preferred embodiment of the present invention, a bearing is provided between said bolt and said top cover.

Furthermore, in accordance with another preferred embodiment of the present invention, said bearing is made of bronze.

Furthermore, in accordance with another preferred embodiment of the present invention, said chamber is located in an extension of said body that is a cylindrical middle flange, said cylindrical middle flange is secured to said body by screws.

Furthermore, in accordance with another preferred embodiment of the present invention, a portion of said cylindrical middle flange is adjacent to said column.

Furthermore, in accordance with another preferred embodiment of the present invention, a bearing is provided between the portion of said middle flange and displaceable column so that the column may slide freely on the flange.

Furthermore, in accordance with another preferred embodiment of the present invention, said bearing is a linear bearing.

Furthermore, in accordance with another preferred embodiment of the present invention, said bearing is made of bronze.

Furthermore, in accordance with another preferred embodiment of the present invention, said chamber is provided with at least one port.

Furthermore, in accordance with another preferred embodiment of the present invention, a valve position indicator is provided in one of said at least one port, said valve position indicator is connected to said column, a portion of said height indicator is positioned outside the control valve.

Furthermore, in accordance with another preferred embodiment of the present invention, a bottom guide is provided in said body, one side of said bottom guide is anchored in a sealed bore that is located beneath said bolt and aligned to it.

Furthermore, in accordance with another preferred embodiment of the present invention, a check closure is provided inside and concentric to said displaceable column, said check piston is mounted on a sheath, said sheath is incorporated in said valve closure.

Furthermore, in accordance with another preferred embodiment of the present invention, a portion of a bottom guide is inserted inside said sheath so that said bottom guide guides said check closure when said guide piston slides inside said column.

Furthermore, in accordance with another preferred embodiment of the present invention, when fluid flows from said outlet to said inlet, said check closure slides downwardly inside the column, pushing said valve closure so that to prevent the flow of fluid through said passageway.

Furthermore, in accordance with another preferred embodiment of the present invention, a check bearing is provided between said displaceable column and said check closure.

Furthermore, in accordance with another preferred embodiment of the present invention, said check closure is provided with a position indicator.

Furthermore, in accordance with another preferred embodiment of the present invention, said position indicator pass through a conduit drilled in said bolt and wherein said position indicator protrudes through said top cover, said position indicator is secured to said conduit by an indicator seal.

Furthermore, in accordance with another preferred embodiment of the present invention, said check closure is provided with a speed controlling means, said speed controlling means is adapted to cushion and control travel speed of said check closure.

Furthermore, in accordance with another preferred embodiment of the present invention, said speed controlling means is at least one orifice provided in the check closure.

DETAILED DESCRIPTION OF THE INVENTION AND FIGURES

The unique control valves of the present invention are designated to control the flow of fluids, whether liquids or gas. The control valves of the present invention are preferably controlled in a hydraulic manner but may also be electrically operated or operated in any other way. The control valves of the present invention may be provided with a check valve that is operated automatically when the flow pattern changes.

Figure 1:
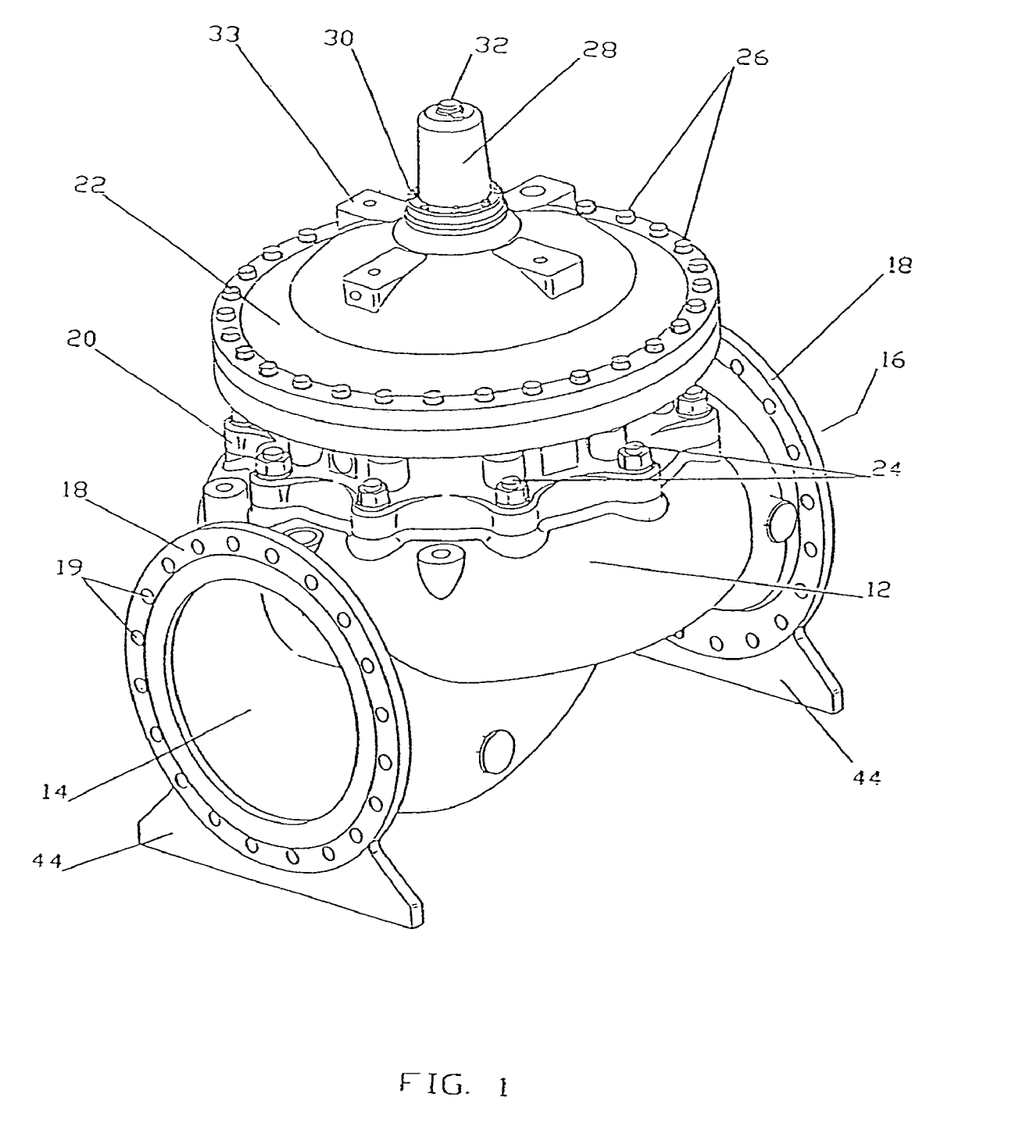
FIG. 1 illustrates an isometric view of a control valve in accordance with a preferred embodiment of the present invention.

Reference is now made to FIG. 1, illustrating an isometric view of a control valve in accordance with a preferred embodiment of the present invention. Control valve 10 has a wide main body 12 having a substantially globe pattern. Body 12 is provided with an inlet port 14 (upstream) and an outlet port 16 (downstream), each provided with a flange 18 adapted to connect control valve 10 to a pipeline (not shown in the figures). In order to secure control valve 10 to the pipeline, flange 18 is provided with bores 19 through which screws that are screwed to a corresponding flange in the edge of the pipeline, may be screwed. The fluid that flows through the pipeline, hence through the valve, is flowing from inlet port 14 to outlet port 16 while the streamlines are kept semi-straight.

Figure 3A:
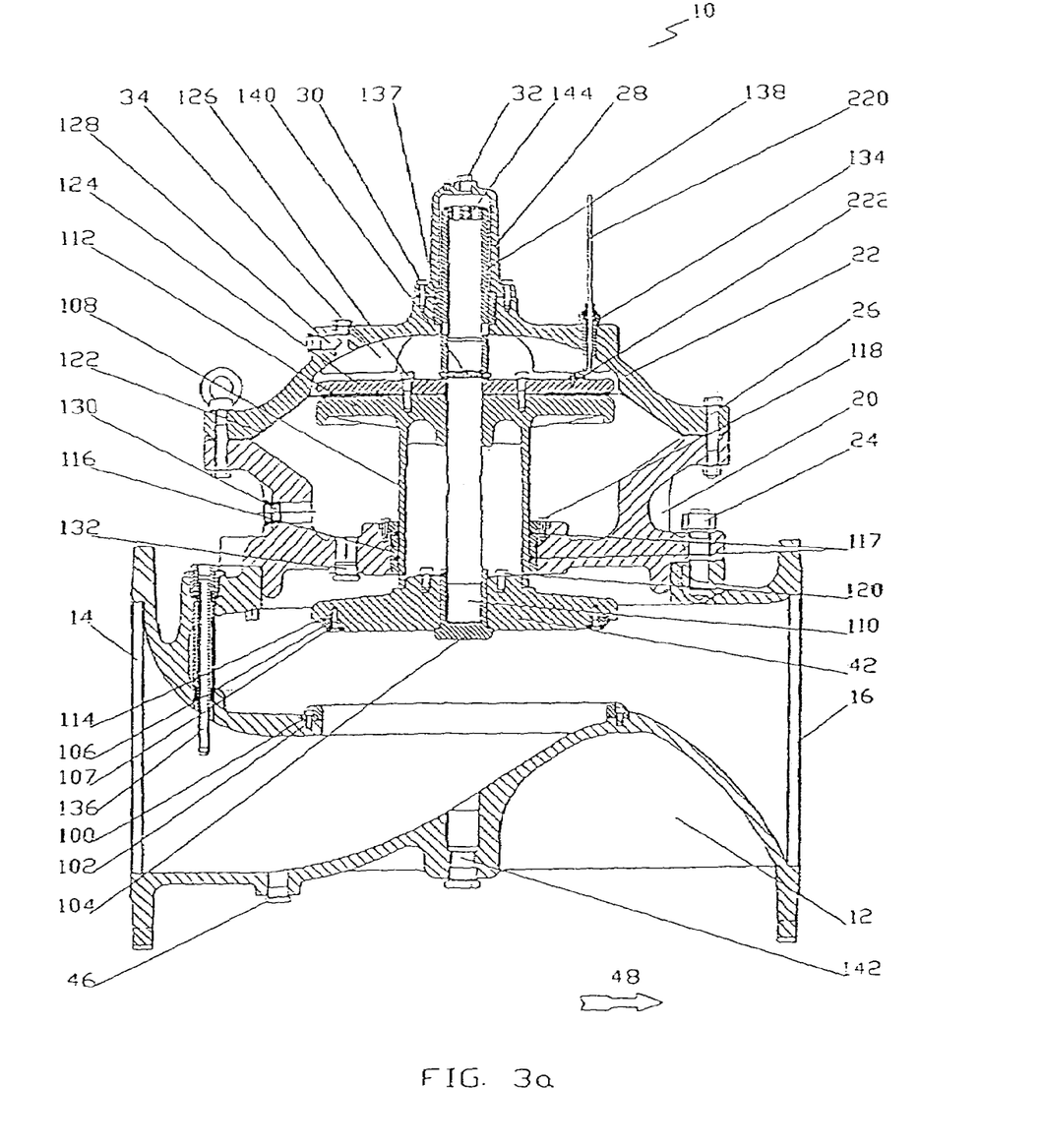
FIG. 3a, b illustrates a lateral cross sectional view of the control valve shown in FIG. 1, in an open position and a closed position, respectively.

Attached to main body 12 is a middle flange 20 that acts as a separating partition between the main body and a piston actuator chamber (shown in the cross section illustrations in FIG. 3). The outer pattern of middle flange 20 is in the shape of a short cylinder that is attached on top of the globular main body. A cover 22 covers the actuator chamber. Middle flange 20 is firmly attached to main body 12 by several bolts 24 that are positioned all around the connection line between both bodies and cover 22 is also bolted by several bolts 26 to middle flange 20. A top guide cover 28 is screwed by screws 30 to cover 22. Cover 22 is provided with top stopping ribs 33 (better shown in FIG. 3a) that stops the movements of inner parts that will be discussed herein after from reaching cover 22. A central indicator plug 32 is provided on top of top guide cover 28 so that a position indicator my be installed therein.

Figure 2A:
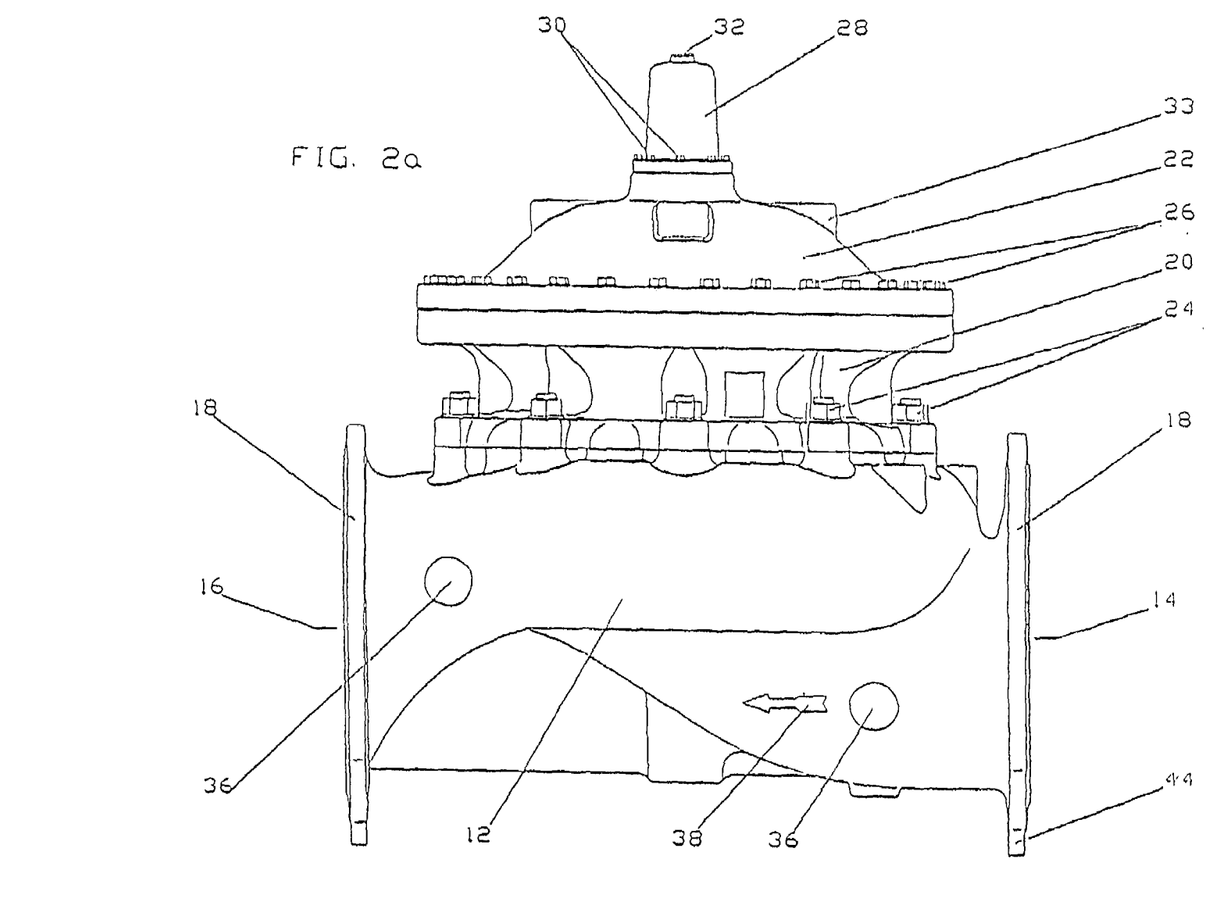
FIG. 2a, b, c, d illustrates a side view, a back view, an upper view and a bottom view, respectively, of the control valve shown in FIG. 1.

Reference is now made to FIG. 2a illustrating a side view of the control valve shown in FIG. 1. The soft profile of body 12, between inlet port 14 and outlet port 16 can be clearly seen in the side view. One of the disadvantages of most control valves is the interruption of the valve to the flow pattern of the fluid flowing through the line to which the valve is connected. The interruption to the streamlines is more pronounced when the flow in the line is plug flow, which is the most abundant case especially in industry. The main streamline in the case of the control valves of the present invention does not divert in an angle greater than 45°. The soft profile, the upstream and downstream, in the body through which the fluid flows impose minimal interruption to the streamlines of the fluid so that when the valve is in a fully open position, the flow remains substantially stable and the pressure in the pipeline stays substantially the same.

Body 12 is provided with four hydraulic control hubs 36 that may be used for hydraulic control hookup or connections. An arrow 38 is drawn on the outer surface of body 12 so that to mark the direction of the flow.

Figure 2B:
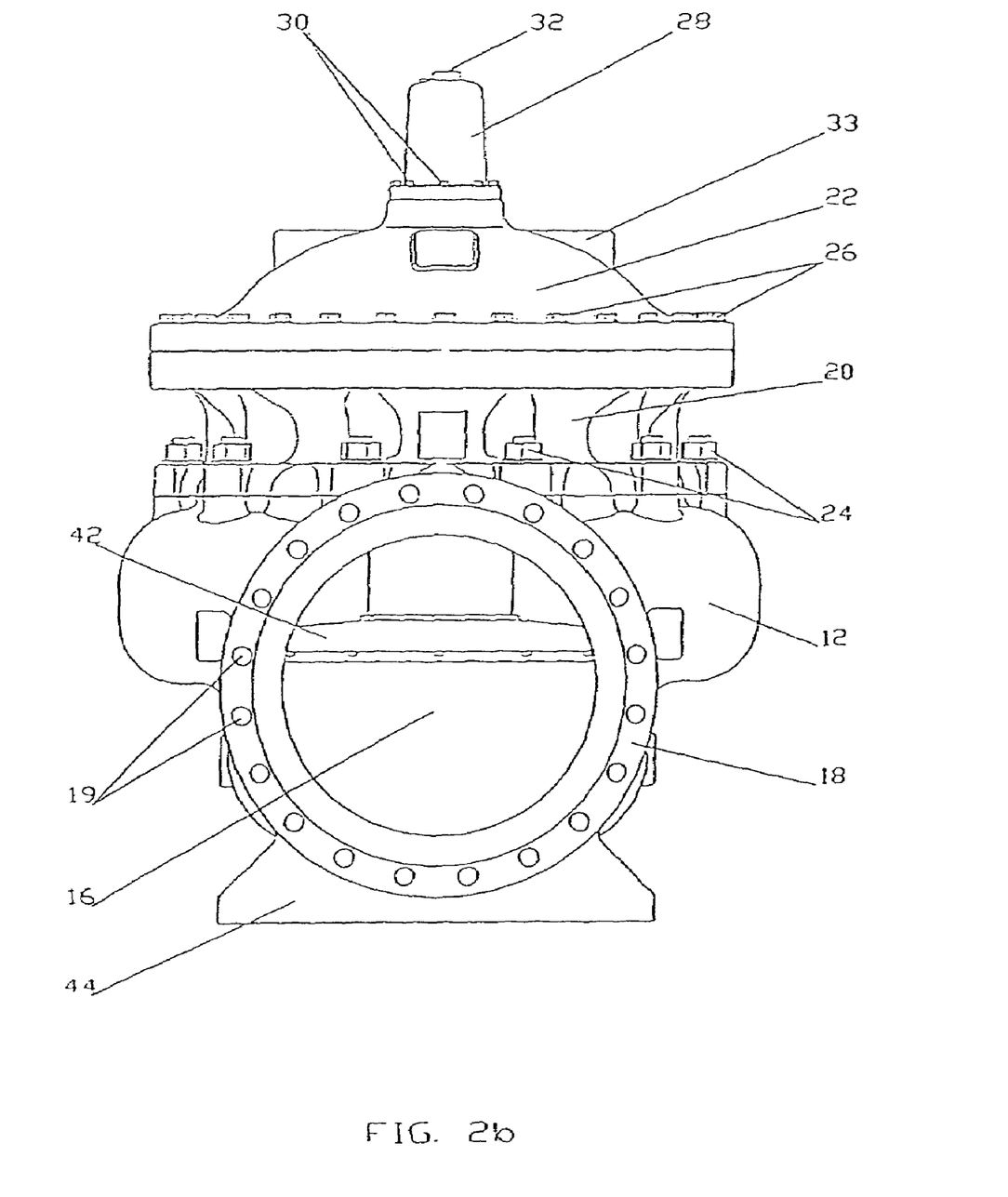

Reference is now made to FIG. 2b illustrating a back view of the control valve shown in FIG. 1. The interior of body 12, a passageway 40 of valve 10 may be seen through outlet port 14 as well as a portion of a valve closure 42. Valve closure 42 is a movable part that regulates the flow of fluid from a completely closed passageway 40 to completely open passageway. The regulation of flow is according to the position of valve closure 42 as will be comprehensively discussed herein after.

Control valve 10 is provided with legs 44, preferably two lateral legs that support the valve. Each one of legs 44 may be an extension of flange 18.

Figure 2C:
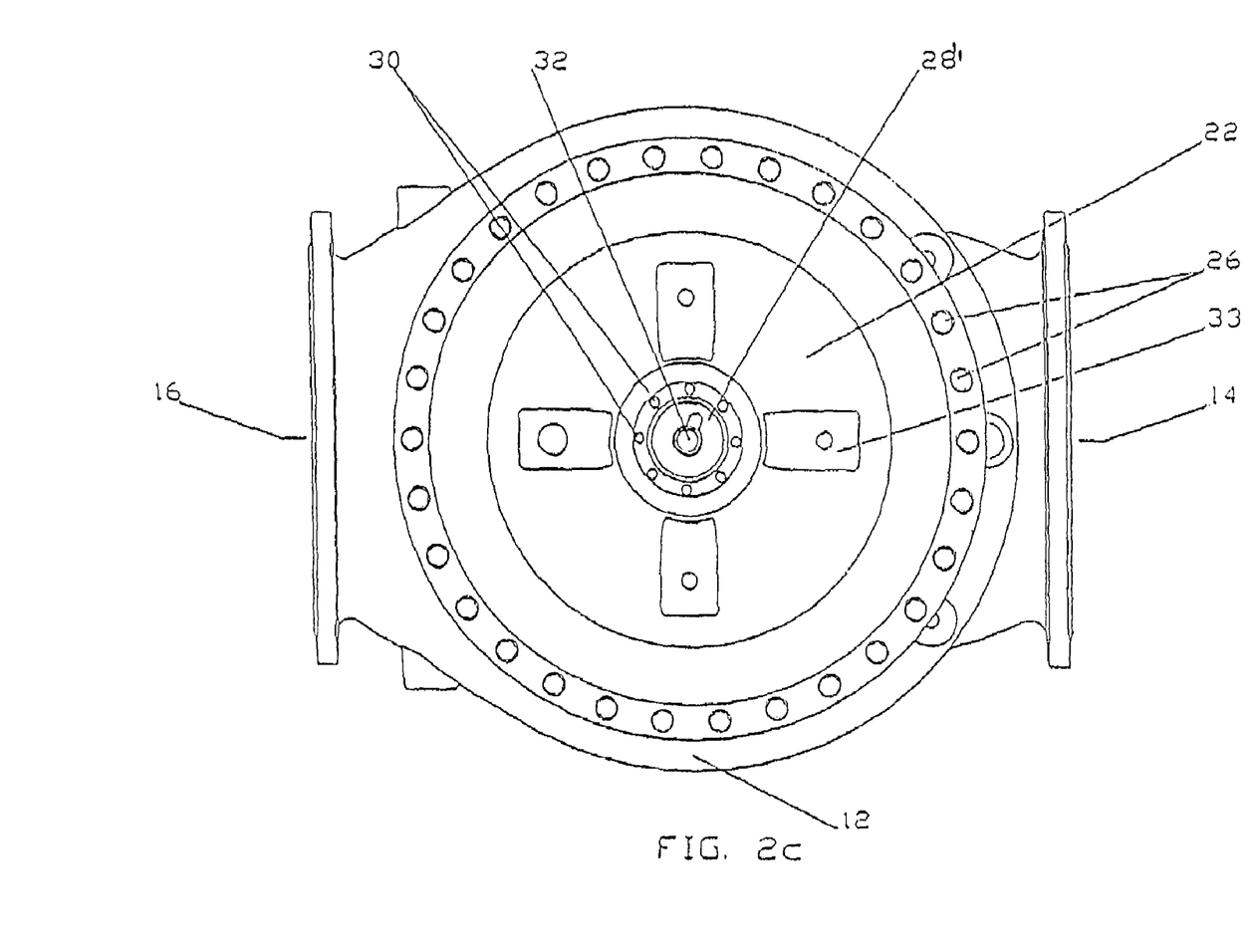
Figure 2D:
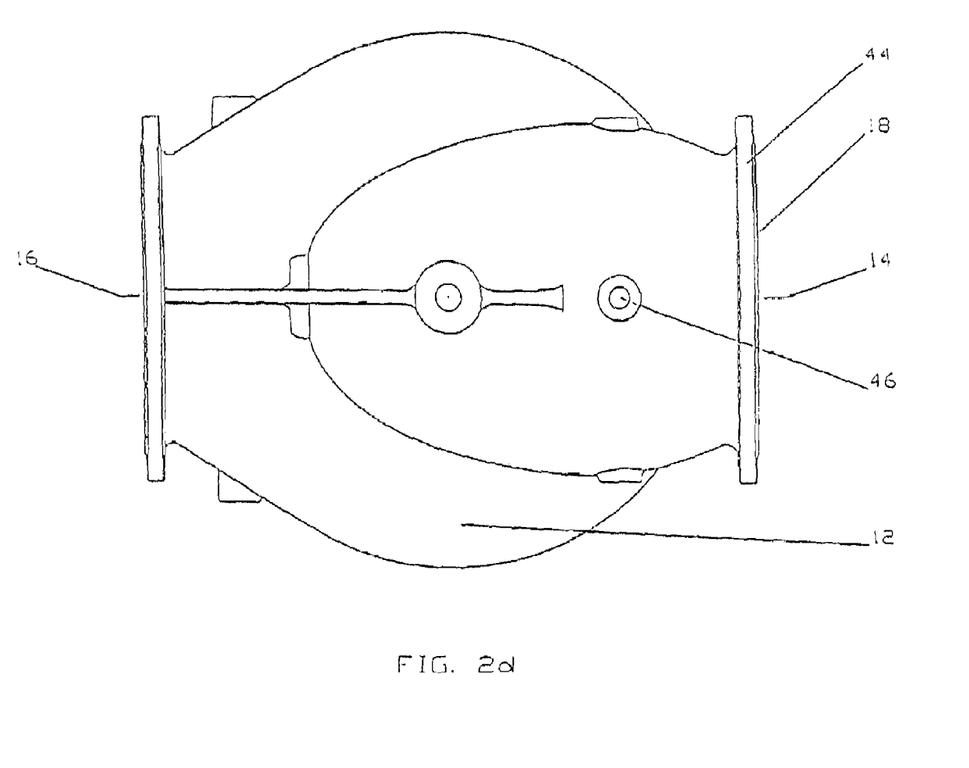

Reference is now made to FIGS. 2c and d illustrating an upper view and a bottom view, respectively, of the control valve shown in FIG. 1. The globular shape of control valve 10 may be clearly seen in both Figures. The bottom of body 12 is provided with a sealed drain port 46 that may be used for maintenance of the valve in order to drain the valve from liquids.

Reference is now made to FIGS. 3a and b illustrating a lateral cross sectional view of the control valve shown in FIG. 1, in an open position and a closed position, respectively. The streamlined profile of passageway 40 is clearly shown and its advantages over other types of valves had been explained herein before. Arrow 48 indicates the flow direction of fluids through passageway 40, from inlet port 14 to outlet port 16. A circular valve seat 100 circumscribing passageway 40 is screwed by screws 102 to body 12. Valve seat 100 is adapted to receive and support valve closure 42 that regulates the flow through the passageway. The flow is regulated by the distance of valve closure 42 from valve seat 100, e.g., when valve closure 42 is contiguous to valve seat 100 and seats on it there is no passage of liquid through control valve 10 (FIG. 3b), when valve closure 42 is at the utmost upper position (FIG. 3a) the valve is fully open and liquid may flow freely through the control valve. Valve closure 42 is provided at its circumference with a valve seal 106 screwed by screws 114 and held in place by a seal washer 107. In the closed position shown in FIG. 3b, valve seal 106 prevent any leakage of fluid from the upstream to the downstream so that control valve 10 is sealingly blocking in a drip tight manner any passage of fluid.

Figure 3B:
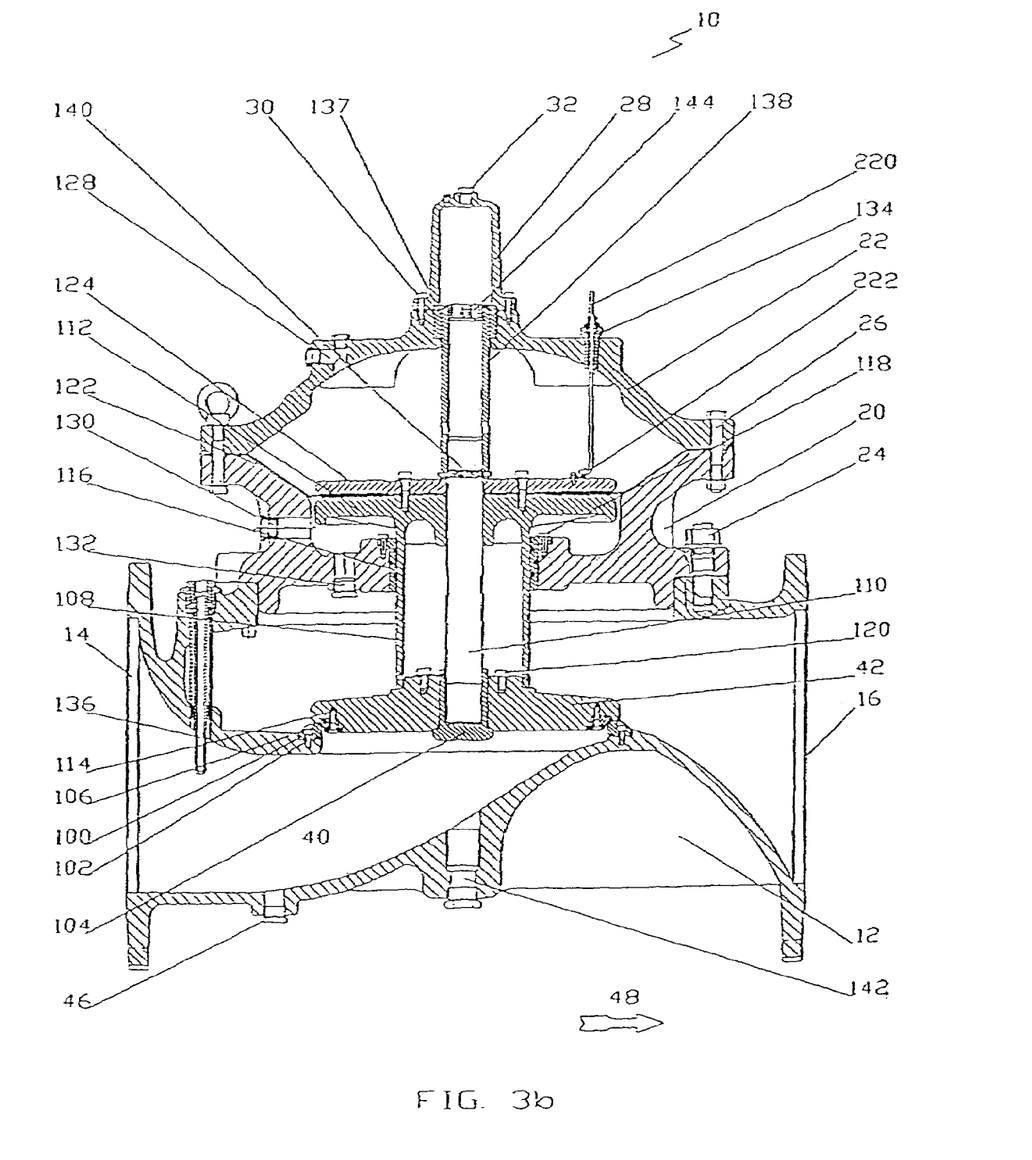

Valve closure 42 is attached to a column that is shaped as a mushroom having especially wide and hollow stem 108 and a dish 112. The unique feature of the column in the control valves of the present invention as will be discussed herein after is the fact that the column is relatively wide (about 40–60 percent of the valve seat's diameter), providing the column guidance and stability. A concentric center bolt 110 is positioned inside stem 108. One side of center bolt 110 is attached to a cup 104 in valve closure 42 and the other side passes through dish 112 and top diaphragm washer 124. Cup 104 is an integrated part of valve closure 42 and is attached to it by screw 120. The column drives valve closure 42 up and down between the open and the closed position. The fact that the column has a wider stem relative to prior art control valves provides the control valve of the present invention with stable regulation of flow and pressure.

The movements of the column are actuated from the actuator control chamber. The actuator control chamber is bounded by middle flange 20, cover 22 and stem 108. Middle flange 20 is provided with an inner extension that contiguous stem 108. A center bearing 116, which is a linear bearing, provided with O-ring seals 117 is positioned between the extension of middle flange 20 and stem 108 so that the stem may slide on the flange when it moves between the open and the closed positions. Center bearing 116 is attached to the flange's extension by screws 118.

The actuator of the present invention is preferably hydraulic actuator, actuated by a diaphragm that divides the actuator into two control chambers, the upper and the lower chambers. Diaphragm 122 is a round elastic material that is suspended by bolts 26 between cover 22 and middle flange 20. Diaphragm 122 is adjacent to the column's dish 112 and is attached to it by a top diaphragm washer 124 secured by screws 126. Diaphragm 122 divides the actuator into the two chambers, each having a different volume, depending on the position of the diaphragm; hence, the position of the column. It is possible to maintain different pressures in the upper and the lower chambers or to equalize the pressure in both chambers. In order to be able to control the pressures in the chambers, control ports are provided in the cover and in the separating partition (middle flange 20). Control ports 128 are drilled in cover 22 so that the pressure in the upper chamber is controlled. Control port 130 is drilled in the sidewall of middle flange 20. Another port 132 is drilled in the extension of middle flange 20 so that the lower chamber is connected with the downstream pressure for cases where only the top chamber controls the action of the valve.

Body 12 is provided with a bore drilled in the upstream side of the valve. The bore is provided with an inline self-flashing control filter 136. The effective surface of dish 112 is greater than the effective surface of valve closure 42 so that even when the pressure in the upstream is the same as the pressure in the upper chamber, the net force of the column will posh it down towards closure.

When the valve is to be closed, the pressure in the upper chamber is raised through outline hydraulic port 128. The pressure in the upper chamber causes diaphragm 122 to be pushed downwardly while pushing dish 112 of the column. Observing FIG. 3b that illustrates a control valve of the present invention in a closed position, it can be seen that the whole mushroom-like column is in a downwardly position, while valve closure 42 seats on valve seat 100. Stem 108 slides on center bearing 116. In any position in between the two extreme positions (open and close), control over the pressures may be performed through control ports 128, 130 and 132.

Center bolt 110 is attached on top of top diaphragm washer 124 to a top guide 138 by a nut 140. Top guide 138, which slides on top bearing 137, provides additional stability to the column up and down movements. In the open position that may be seen in FIG. 3a, top guide 138 is fully accommodated in top guide cover 28. Top guide 138 is provided with bores 144 that allow water to pass through so that the guide may be easily inserted into top guide cover 28. Inner top stopping ribs 34 are provided so as to limit the traveling distance of the column when the valve is open. Top bearing 140 as well as center bearing 116 are preferably made of bronze.

Body 12 is further provided with a sealed bore 142 that is positioned substantially beneath central bolt 110. Sealed bore has no function in the application shown in FIGS. 3a and b but a check valve may be installed in this position. This application is shown in FIGS. 4a, b and c and is explained herein after.

Figure 4A:
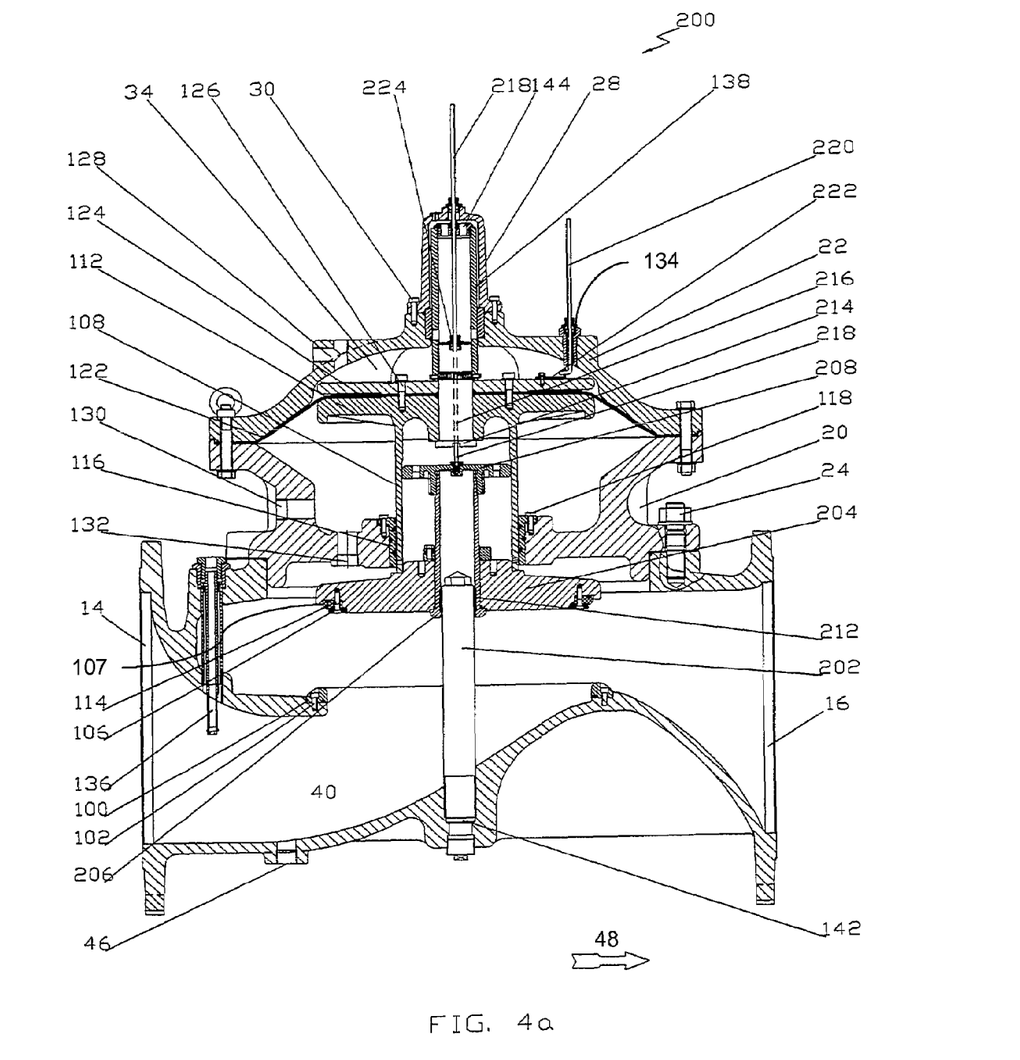
FIG. 4a, b, c illustrates lateral cross sectional views of an independent inner check valve in accordance with another preferred embodiment of the present invention, in an open position, a closed position and a check closed position, respectively.
Figure 4B:
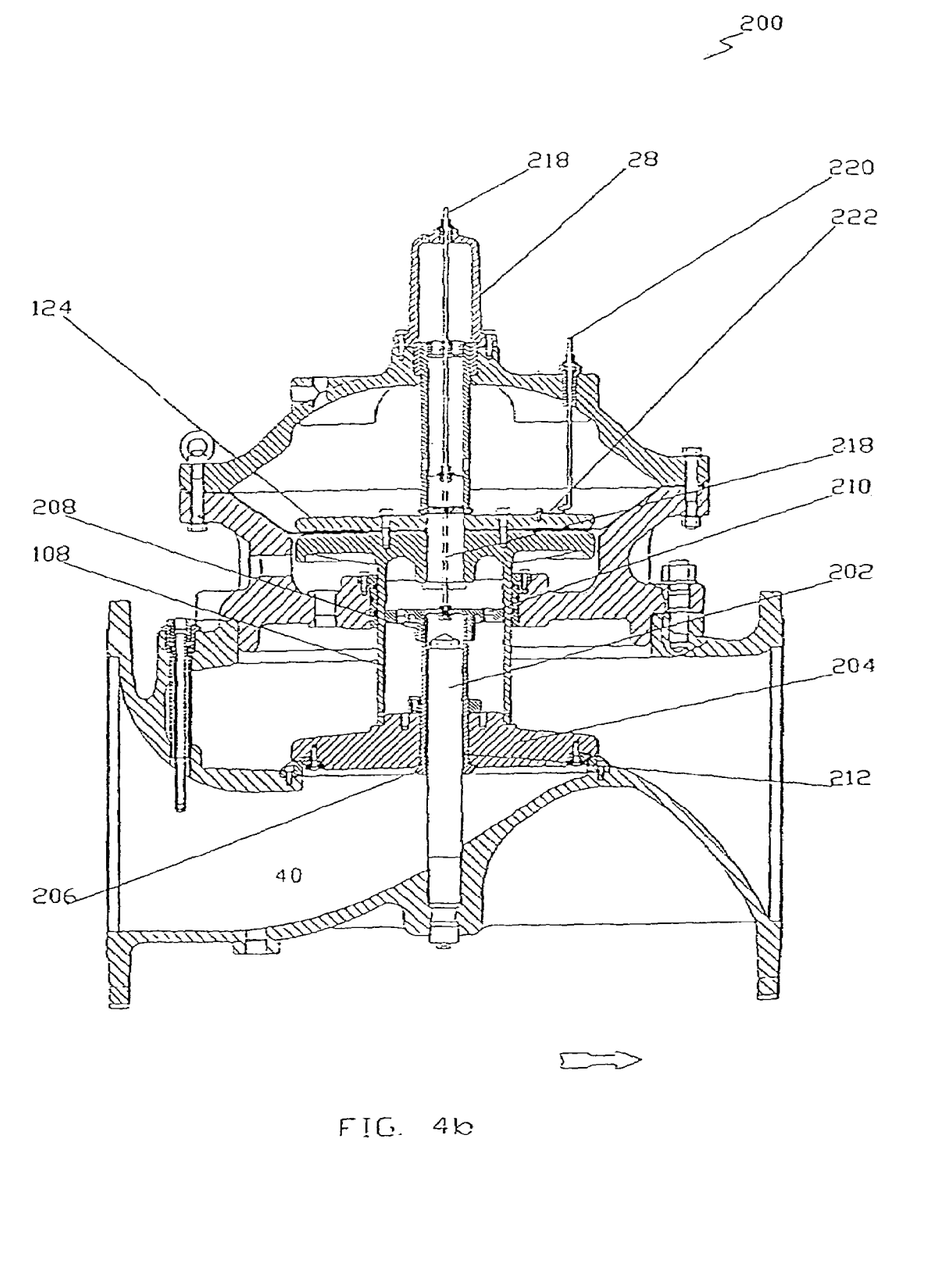
Figure 4C:
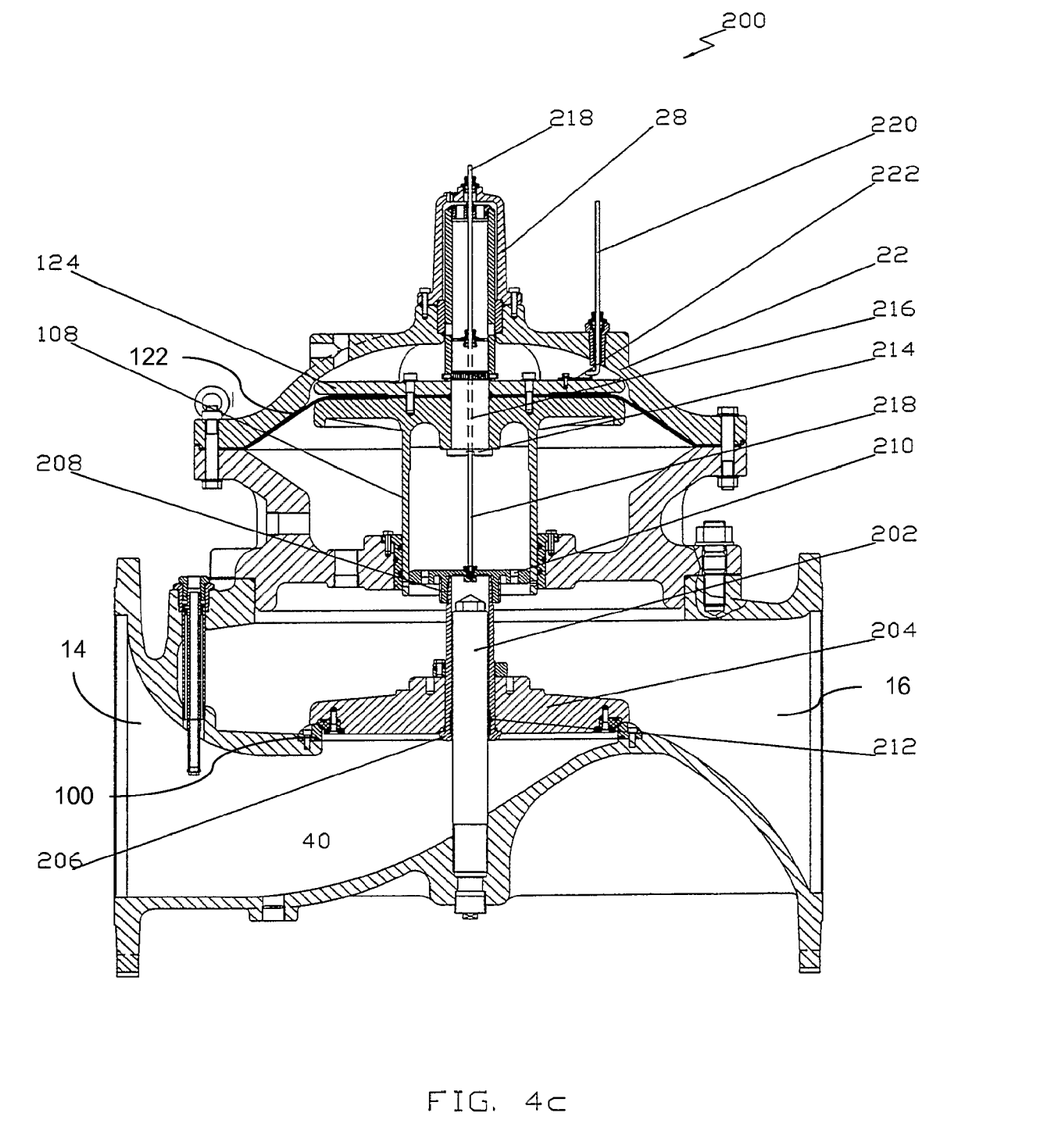

Reference is now made to FIGS. 4a, b and c illustrating lateral cross sectional views of a check control valve in accordance with another preferred embodiment of the present invention, in an open position, a closed position and a check closed position, respectively. The main features of control valve 200 are similar to the features of control valve 10 and may be clearly seen in FIG. 4a, but control valve 200 is provided also with a check valve that is a precaution device. The check valve closes control valve 200 from passage of liquid upon a drastic change in the flow regime, for example, if the liquid is suddenly flowing backwards.

For that matter, sealed bore 142 is opened and a bottom guide 202 is inserted and positioned with one end in sealed bore 142. The other end of bottom guide 202 is slidingly inserted in a sheath 206 that is threaded through a bore made in the center of modified valve closure 204. Sheath 206 is positioned in the interior of stem 108 and is substantially concentric to the stem. Circumscribing modified valve closure 204 is a valve seal 106 and seal washer 107 that is similar to the valve seal and seal washer that is provided in control valve 10.

The portion of sheath 206 that is in the interior of stem 208 is attached to a check cushioning piston 208 that is bounded by the interior stem's sidewall. Check cushioning piston 208 may slide inside stem 108 downwardly pushing down sheath 206 as well as modified valve closure 204. This situation may be seen in FIG. 4c that illustrates the check piston in a closed position while the actuator is open; hence diaphragm 122 and the mushroom shaped column are in an upward position. In this situation, control valve 200 is closed to the passage of liquids from its outlet 16 to its inlet 14 since modified valve closure 204 seats on valve seat 100 and seals passageway 40, but the closure of the control valve is not dependent of the diaphragm actuator position. Bottom guide 202 facilitates an accurate and steady slidel of check closure 204 upon check bearing 212 while piston 208 is guided by the inner wall of stem 108.

Check cushioning piston 208 is provided with orifices 210 that act as speed controllers. Orifices 210 may be fix or one-way orifices that form turbulence and facilitate a controlled closing speed of the check piston. The fall of the piston is cushioned, as well as its upwardly traveling. Any other means of controlling the traveling speed of the check piston may be used, such as using needle valves.

The column shape is similar to the shape of the column in embodiment 10 except of the center bolt that is now shorter due to the positioning of the check piston inside the stem. Bolt 214 that pass through dish 112 and top diaphragm washer 124 is provided with a conduit 216 drilled substantially through its center. A check indicator 218 connected to the top of check piston 208 pass through conduit 216 and indicated the positioning of the check piston. Check indicator 218 is provided with a check indicator seal 224 that stabilizes the indicator in its location in conduit 216. As can be seen in FIG. 4a, check indicator 218 indicates that check piston 208 is in an upward position and in FIGS. 4b and c, check indicator 218 indicates that the check piston is in a downward position, hence the valve is closed.

In order to distinguish between two closed positions, the closed check piston and the closed column, an additional actuator position indicator 220 is provided. Indicator 220 pass through cover 22 and is hooked to top diaphragm washer 124 by hook 222. A side indicator plug 134 is also provided. When passageway 40 is closed due to the fall of check piston 208, upon a drastic change in the flow regime, check indicator 218 is in a downward position while indicator 220 remains in an upward position (shown in FIG. 4c). When passageway 40 is closed due to a regular closure of the column driven by the diaphragm actuator, both indicators, 218 and 220, are in a downward position (shown in FIG. 4b).

It should be clear that the description of the embodiments and attached Figures set forth in this specification serves only for a better understanding of the invention, without limiting its scope as covered by the following claims.

It should also be clear that a person in the art, after reading the present specification could make adjustments or amendments to the attached FIGS. and above described embodiments that would still be covered by the following claims.

The invention claimed is:

1. A control valve for regulating flow of fluids passing through the valve, the control valve comprising:
   (a) a body having an inlet, an outlet and a passageway through which the fluid passes from said inlet to said outlet;
   (b) an actuator located in a chamber connected to said body;
   (c) a displaceable column deployed so as to be displaced along an axis by said actuator over a range of motion from a most retracted position to a most extended position, said displaceable column including a hollow stem;
   (d) a check valve assembly associated with said displaceable column so as to be slidingly displaceable parallel to said axis relative to said displaceable column, said check valve assembly including a damping piston deployed within said hollow stem so as to limit travel speed of said check valve assembly relative to said displaceable column; and
   (e) a valve closure associated with said check valve assembly, such that, when said displaceable column is displaced to said most extended position, said displaceable column forces said check valve assembly and said valve closure to a sealing position in which said valve closure blocks the passage of fluid from said inlet to said outlet and, when said displaceable column is displaced towards said most retracted position, said check valve assembly allows displacement of said valve closure between said sealing position and an open position in which said inlet is in fluid communication with said outlet.

2. The control valve of claim 1, wherein said passageway is shaped such that a flow of fluid from said Inlet to said outlet tends to displace said valve closure towards said open position.

3. The control valve of claim 1, wherein said check valve assembly is deployed such that gravity tends to displace said valve closure towards said closed position.

4. The control valve of claim 1, wherein said hollow stem is substantially cylindrical, and wherein said part of said check valve assembly is deployed substantially coaxially within said hollow stem.

5. The control valve of claim 1, further comprising a guide post associated with said body and extending through said passageway parallel to said axis, wherein said check valve assembly is slidingly engaged on said guide post.

6. The control valve of claim 1, further comprising a position indicator associated with said check valve assembly so as to indicate externally to the control valve a current position of said check valve assembly.

7. The control valve of claim 1, further comprising a position indicator associated with said displaceable column so as to indicate externally to the control valve a current position of said displaceable column.

* * * * *